(12) United States Patent
Morrison et al.

(10) Patent No.: US 6,919,880 B2
(45) Date of Patent: Jul. 19, 2005

(54) CALIBRATING CAMERA OFFSETS TO FACILITATE OBJECT POSITION DETERMINATION USING TRIANGULATION

(75) Inventors: Gerald Morrison, Calgary (CA); David Holmgren, Calgary (CA)

(73) Assignee: Smart Technologies Inc. (CA)

( * ) Notice: Subject to any disclaimer, the term of this patent is extended or adjusted under 35 U.S.C. 154(b) by 328 days.

(21) Appl. No.: 09/870,698

(22) Filed: Jun. 1, 2001

(65) Prior Publication Data

US 2003/0043116 A1 Mar. 6, 2003

(51) Int. Cl.[7] ................................................ G09G 5/00
(52) U.S. Cl. ...................... 345/173; 345/178; 345/179; 178/18.01; 178/18.03
(58) Field of Search ................................. 345/173, 174, 345/175–180; 178/18.01, 18.03, 18.04

(56) References Cited

U.S. PATENT DOCUMENTS

| | | | | |
|---|---|---|---|---|
| 4,247,767 A | * | 1/1981 | O'Brien et al. | 250/221 |
| 4,507,557 A | | 3/1985 | Tsikos | 250/341 |
| 4,742,221 A | | 5/1988 | Sasiki et al. | 250/221 |
| 4,746,770 A | | 5/1988 | McAvinney | 178/18 |
| 4,818,826 A | | 4/1989 | Kimura | 178/19 |
| 5,502,568 A | | 3/1996 | Ogawa et al. | 356/375 |
| 5,936,615 A | | 8/1999 | Waters | 345/173 |
| 6,008,798 A | | 12/1999 | Mato, Jr. et al. | 345/168 |
| 6,100,538 A | | 8/2000 | Ogawa | 250/559.38 |
| 6,208,330 B1 | | 3/2001 | Hasegawa et al. | 345/173 |
| 6,335,724 B1 | | 1/2002 | Takekawa et al. | 345/173 |
| 6,414,671 B1 | * | 7/2002 | Gillespie et al. | 345/157 |
| 6,421,042 B1 | | 7/2002 | Omura et al. | 345/157 |
| 6,531,999 B1 | * | 3/2003 | Trajkovic | 345/157 |
| 6,563,491 B1 | * | 5/2003 | Omura | 345/173 |
| 2001/0019325 A1 | | 9/2001 | Takekawa | 345/157 |
| 2001/0022579 A1 | | 9/2001 | Hirabayashi | 345/175 |
| 2001/0026268 A1 | | 10/2001 | Ito | 345/175 |

FOREIGN PATENT DOCUMENTS

| | | | | |
|---|---|---|---|---|
| DE | 198 10 452 A1 | 12/1998 | ........... | G06F/3/033 |
| JP | 57-211637 | 12/1982 | ............ | G06F/3/03 |
| JP | 8-240407 | 9/1996 | | |
| JP | 9-91094 | 4/1997 | | |
| JP | 9-319501 | 12/1997 | ............ | G06F/3/03 |
| WO | WO 99/40562 | 8/1999 | ............ | G09G/5/00 |

OTHER PUBLICATIONS

"CCDs in optical touch panels deliver high resolution", Bud K. Funk, Electronic Design, Sep. 27, 1980, pp 139–143.
International Search Report with a date of mailing of Oct. 22, 2001 for PCT/CA 01/ 00980 with an International Filing Date of Jul. 5, 2001.

* cited by examiner

*Primary Examiner*—Richard Hjerpe
*Assistant Examiner*—Kimnhung Nguyen
(74) *Attorney, Agent, or Firm*—Katten Muchin Zavis Rosenman

(57) ABSTRACT

A touch system includes a reference frame, and at least two cameras having fields of view that overlap within the reference frame. The position of an object relative to the reference frame is determined from captured images of the object based on triangulation. The fields of view of the at least two cameras are rotated with respect to the coordinate system of the reference frame to define offset angles. The touch system is calibrated by: capturing an image of the object using each the at least two cameras at least one location within the reference frame; and for each location: determining the position of the object within each image, the position of the object within each image being represented by an angle φ, the angle being equal to the angle formed between an extremity of the field of view extending beyond the reference frame and a line extending from the camera that intersects the object within the image; and mathematically calculating the offset angles of the at least two cameras based on the angle determined for each image and the position of the at least two cameras relative to the coordinate system assigned to the reference frame.

33 Claims, 3 Drawing Sheets

CALIBRATING CAMERA OFFSETS TO FACILITATE OBJECT POSITION DETERMINATION USING TRIANGULATION

FIELD OF THE INVENTION

The present invention relates generally to target acquisition and in particular to a method of calculating camera offsets to facilitate object position determination using triangulation.

BACKGROUND OF THE INVENTION

Touch systems are well known in the art and typically include a touch screen having a touch surface on which contacts are made using a pointer in order to generate user input. Pointer contacts with the touch surface are detected and are used to generate corresponding output depending on areas of the contact surface where the contacts are made.

In co-pending U.S. patent application Ser. No. 09/610,481 filed on Jul. 5, 2000 for an invention entitled "Passive Touch System and Method of Detecting User Input", assigned to the assignee of the present invention, the content of which is incorporated herein by reference, a touch system is disclosed. The touch system includes a touch screen coupled to a master controller and a computer coupled to the master controller. The computer executes one or more application programs and provides display output that is presented on the touch screen. The touch screen, master controller, computer and projector form a closed-loop so that user contacts with the touch screen can be recorded by the computer as writing or drawing or used to control execution of application programs executed by the computer.

The touch screen includes a touch surface in the form of a rectangular planar sheet of material bordered by a rectangular bezel or frame. A two-dimensional digital signal processor (DSP) based CMOS digital camera is mounted adjacent each corner of the touch screen. Each digital camera is aimed at the touch screen so that its field of view encompasses a designated edge of the touch surface. In this way, the entire touch surface is within the fields of view of the digital cameras. The fields of view of the digital camera also overlap so that a pointer in close proximity to the touch surface appears within the fields of view of at least two of the digital cameras. This allows the position of such a pointer relative to the touch surface to be calculated using triangulation.

During operation of the touch system each digital camera acquires images of the touch surface within its field of view at a desired frame rate. The acquired images are processed by the digital cameras to determine if a pointer is in the acquired images. When a pointer is in an acquired image, the acquired image is further processed by the digital camera that acquired the image to determine the median line or tip of the pointer within the acquired image. The median line or tip of the pointer is represented by a number. This pointer information is converted into a pointer information packet (PIP) by the digital camera and the PIP is queued for transmission to the master controller.

The master controller polls the digital cameras for PIPs. When the master controller receives a PIP, the master controller divides the number representing the median line or tip of the pointer by the resolution of the digital camera. The master controller then multiplies this result by field of view (FOV) of the digital camera and then subtracts a fixed error correcting calibration angle $\delta$ to yield an angle $\phi$. The calculated angle $\phi$ is presumed to be the angle formed between the designated peripheral edge of the touch screen encompassed in the field of view of the digital camera that generated the PIP and a line extending from the optical axis of the digital camera that intersects the pointer within the image.

As mentioned above, the aiming of the digital cameras ensures that when a pointer is brought in close proximity to the touch screen, the pointer is captured in images acquired by at least two digital cameras. As a result when a pointer is brought in close proximity to the touch screen, at least two PIPs are received by the master controller and hence, two angles are calculated by the master controller. With two angles available, the master controller determines the intersection point of the lines extending from the optical axes of the digital cameras which generated the PIPs, that intersect the pointer within the acquired images. Using triangulation the position of the pointer relative to the touch screen in Cartesian coordinates is calculated. The master controller in turn transmits this pointer position data to the personal computer. In this manner, the pointer position data transmitted to the personal computer can be recorded as writing or drawing or can be used to control execution of application programs executed by the computer. The computer also updates the display output so that information presented on the touch surface reflects the pointer activity.

As mentioned above, each digital camera is mounted adjacent a corner of the touch screen and aimed so that its field of view encompasses a designated peripheral edge of the touch surface. Ideally, the extremity of the field of view of each digital camera extends slightly beyond the designated peripheral edge of the touch screen by a known amount so that the angles calculated by the master controller are based on a reference frame that corresponds to the touch screen. However, in reality the fields of view of the digital cameras are angularly offset with respect to the peripheral designated edges of the touch screen by unknown amounts due to mechanical tolerances, optical effects and digital camera placement.

In the touch system described above, during calculation of the angles a fixed error correcting calibration angle $\delta$ is subtracted from the calculated angles to take into account the angular offsets of the digital cameras. This calibration of course assumes that the angular offsets of the digital cameras are known and equal. Unfortunately, the angular offset of each digital camera usually differs. Also, the angular offset of each digital camera may change during shipping, installation etc. of the touch system. As a result, the angular offsets of the digital cameras are typically not properly compensated for by the fixed error correcting calibration angle. Unless the actual angular offsets of the digital cameras are known, when the position of a pointer relative to the touch surface is calculated using triangulation based on the calculated angles, the calculated position may be significantly different than its actual position. To complicate matters the calculated position of the pointer may vary significantly depending on the pair of digital cameras whose image data is used to triangulate the position of the pointer. As will be appreciated, this makes it difficult to calculate accurately the position of a pointer relative to the touch screen. In an interactive system where the touch screen is mapped to a computer display so that contacts on the touch screen can be used to invoke computer functions, accurately determining the contact position of the pointer on the touch screen is extremely important.

It is therefore an object of the present invention to provide a novel method of calculating camera offsets to facilitate object position determination using triangulation.

SUMMARY OF THE INVENTION

According to one aspect of the present invention there is provided a method of determining the position of an object relative to a reference frame from captured images of the object based on triangulation, the captured images being taken by at least two cameras having overlapping fields of view within said reference frame, at least one of said cameras having an offset angle causing an extremity of the field of view thereof to extend beyond a boundary of said reference frame, said method comprising the steps of:

capturing an image of the object using each said at least two cameras at at least one location within said reference frame;

for each location:
      determining the position of the object within each image and for each image placing the determined position into a coordinate system corresponding to that of said reference frame; and processing the determined positions to determine at least one of the position of the object at each location and the offset angle of said at least one camera.

According to another aspect of the present invention there is provided a method of determining the position of an object relative to a reference frame from captured images of the object based on triangulation, the captured images being taken by at least two cameras having overlapping fields of view within the reference frame, an extremity of the field of view of each said at least two cameras encompassing a boundary of said reference frame, at least one of said cameras being offset causing the extremity of the field of view thereof to extend beyond said boundary, said method comprising the steps of:

determining the position of the object within each image, the position of the object within each image being represented by an angle, said angle being equal to the angle formed between the extremity of the field of view encompassing the boundary of said reference frame and a line extending from the camera that intersects the object within the image;

determining the offset angle of said at least one camera;

subtracting the offset angle from the angle representing the position of the object within the image taken by said at least one camera to calibrate the angle; and using the calibrated angles to calculate the position of the object with respect to the reference frame using triangulation.

According to yet another aspect of the present invention there is provided a touch system including at least two cameras having overlapping fields of view and a processor to process image data of said at least two cameras, where the position of an object that is within the overlapping fields of view relative to a reference frame is determined by triangulating object position data captured in an image acquired by each camera, a method of calibrating the touch system comprising the steps of:

determining the offset angle of each camera relative to the reference frame;

using the offset angle to calibrate the object position data; and using the calibrated object position data during triangulation to determine the position of said object relative to said reference frame.

According to yet another aspect of the present invention there is provided a touch system including a reference frame, and at least two cameras having fields of each that overlap within said reference frame, wherein the position of an object relative to the reference frame is determined from captured images of the object based on triangulation, and wherein the fields of view of said at least two cameras are rotated with respect to the coordinate system of said reference frame to define offset angles, a method of calibrating said touch system comprising the steps of:

capturing an image of the object using each said at least two cameras at at least one location within said reference frame; and for each location:
      determine the position of the object within each image, the position of the object within each image being represented by an angle $\phi$, said angle being equal to the angle formed between an extremity of the field of view extending beyond the reference frame and a line extending from the camera that intersects the object within the image; and mathematically calculating the offset angles of said at least two cameras based on the angle determined for each image and the position of said at least two cameras relative to the coordinate system assigned to said reference frame.

According to still yet another aspect of the present invention there is provided a touch system comprising:

a generally rectangular reference frame surrounding a touch surface, one corner of the reference frame defining the origin of a coordinate system assigned to said touch surface;

a camera adjacent each corner of the reference frame, each camera being aimed towards said touch surface and capturing images of said touch surface within the field of view the thereof, fields of view of said cameras overlapping within said reference frame, the fields of view of said cameras being offset with respect to said reference frame; and a processor processing the captured images and generating object position data when an object appears in images, said processor determining the position of said object relative to said origin in rectangular coordinates using said object position data based on triangulation, wherein said processor further executes a calibration routine to determine offset angles of said cameras, said offset angles being used by said processor to adjust said object position data prior to said position determination.

According to still yet another aspect of the present invention there is provided a computer readable media including a computer program thereon for determining the offset angles of cameras at different positions along a reference rectangular coordinate system based on object position data generated by said cameras, the object position data generated by each camera representing the position of an object within the field of view of said each camera at least one location within the fields of view of said cameras, said computer program including:

computer program code for relating the object position data generated by each camera to said rectangular coordinate system; and computer program code for mathematically calculating the offset angle of each camera based on the related object position data and the position of said cameras relative to said coordinate system.

The present invention provides advantages in that since the actual digital camera offsets are calculated in real time, the fields of view of the digital cameras can be referenced to a reference frame that corresponds to the touch screen. In this manner, when the position of an object within the fields of view of a pair of digital cameras is calculated using triangulation, the calculated position of the object corresponds to a high degree of accuracy with the actual position of the object relative to the touch screen. Also, since the digital camera offsets are calculated mathematically with a high degree of accuracy in a calibration routine that is executed after installation of the touch system, the need for precision mounting of the digital cameras during manufacturing is relaxed. Since mechanical tolerances with respect to digital camera mounting can be relaxed, touch systems of this nature can be manufactured more quickly and less expensively while ensuring high resolution.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
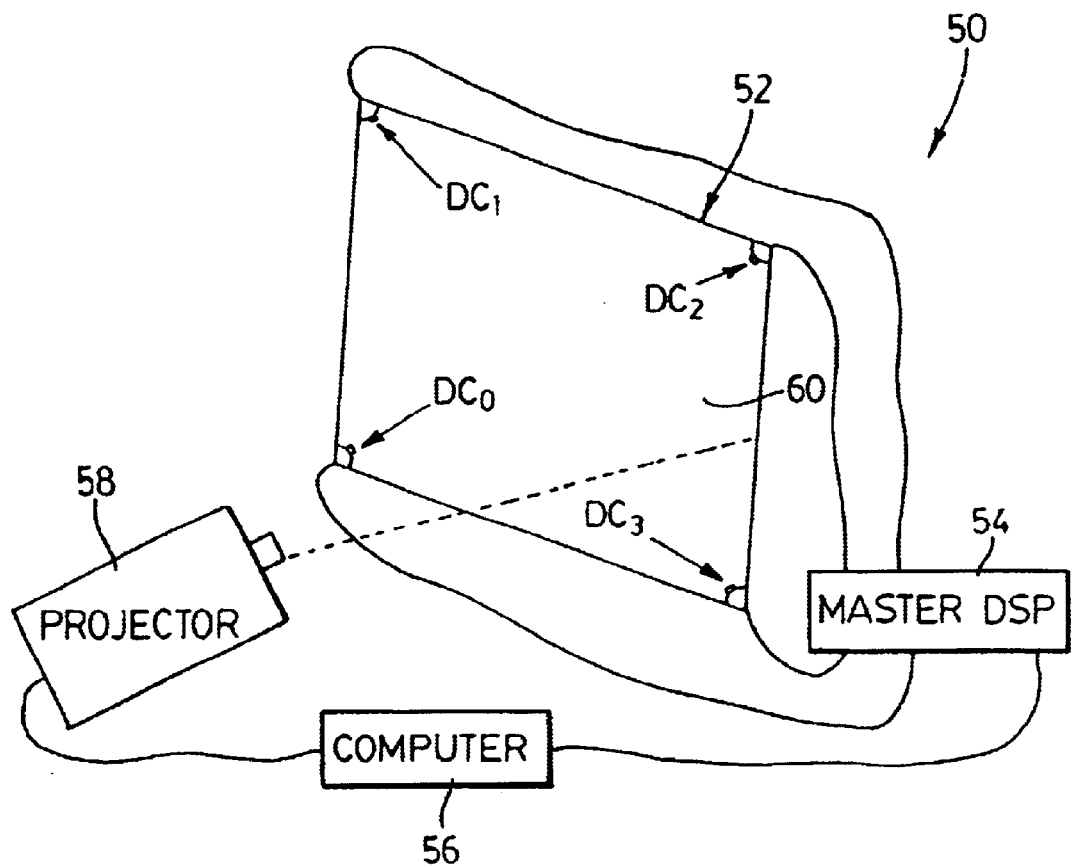
FIG. 1 is a schematic diagram of a touch system in accordance with the present invention.

Turning now to FIG. 1, a touch system of the type described in co-pending U.S. patent application Ser. No. 09/610,481 is shown and is generally identified by reference numeral 50. As can be seen, touch system 50 includes a touch screen 52 coupled to a digital signal processor (DSP) based master controller 54. Master controller 54 is also coupled to a computer 56. Computer 56 executes one or more application programs and provides display output that is presented on the touch screen 52 via a projector 58. The touch screen 52, master controller 54, computer 56 and projector 58 form a closed-loop so that user contacts with the touch screen 52 can be recorded as writing or drawing by the computer 56 or used to control execution of application programs executed by the computer 56.

Figure 2:
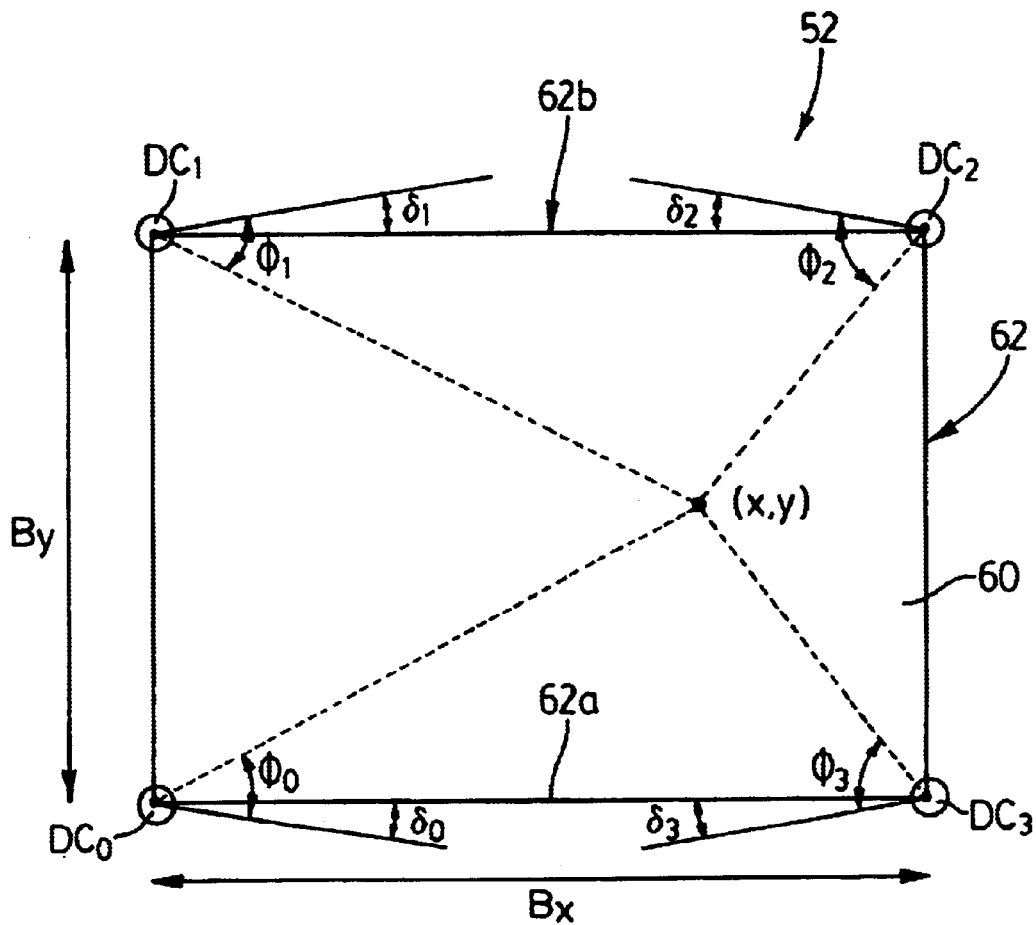
FIG. 2 is a front view of a touch screen forming part of the touch is system illustrated in FIG. 1 showing camera offset angles.

FIG. 2 better illustrates the touch screen 52. As can be seen, touch screen 52 includes a touch surface 60 bordered by a rectangular frame 62. Touch surface 60 is in the form of a rectangular planar sheet of passive material. A DSP-based CMOS digital care $DC_{cam}$ is mounted adjacent each corner of the touch screen 52. Each digital camera $DC_{cam}$ is aimed towards the touch surface 60 so that its field of view encompasses a designated peripheral edge of the touch surface 60. In the designation shown in FIG. 2, the fields of view of digital cameras $DC_0$ and $DC_3$ encompass the lower horizontal edge 60a of the touch surface 60 while the fields of view of digital cameras $DC_1$ and $DC_2$ encompass the upper horizontal edge 60b of the touch surface 60.

Due to mechanical tolerances, optical effects and digital camera placement relative to the touch surface 60, the field of view of each digital camera $DC_{cam}$ is typically angularly offset with respect to the designated peripheral edge of the touch surface 60 that the field of view encompasses. The angular offset of each digital camera is designated by angle $\delta_{cam}$.

During operation of the touch system 50, each digital camera $DC_{cam}$ acquires images of the touch surface 60 within its field of view at a desired frame rate. The acquired images are processed by the digital cameras $DC_{cam}$ to determine if a pointer is in the acquired images. When a pointer is in an acquired image, the acquired image is further processed by the digital camera that acquired the image to determine the median line or tip of the pointer within the acquired image. The median line or tip of the pointer is represented by a number. This pointer information is converted into a pointer information packet (PIP) by the digital camera $DC_{cam}$ and the PIP is queued for transmission to the master controller 54. Specifics concerning the image processing describe above are set out in co-pending U.S. patent application Ser. No. 09/610,481, incorporated herein by reference.

The master controller 54 polls the digital cameras for PIPs. When the master controller 54 receives a PIP, the master controller uses the number representing the median line or tip of the pointer and the field of view of the digital camera to calculate an angle $\phi_{cam}$ using the equation:

$$\tan\phi_{cam} 2\left(\frac{x}{a}\right)\tan\frac{\frac{FOV}{2}}{1-\left(2\frac{x}{a}-1\right)\tan^2\frac{FOV}{2}} \quad (0.1)$$

where:
  x is the number representing the median line or tip of the pointer; and
  a is the total length enclosed by the field of view (FOV) of the digital camera at a distance from the digital camera.

The calculated angle $\phi_{cam}$ is equal to the angle formed between the extremity of the field of view extending beyond the designated peripheral edge of the touch surface 60 of the digital camera that generated the PIP and a line extending from the optical axis of the digital camera that intersects the pointer within the image. Preferably, the extremity of the field of view extends beyond the designated peripheral edge (i.e. in this case the x-axis) of the touch surface 60 within the field of view by a known mount. However, in almost all cases the angular offset of each digital camera DC is different and unknown.

When a pointer is brought in close proximity to the touch surface 60, the pointer is captured in images acquired by at least two digital cameras. As a result, at least two PIPs are received by the master controller 54 and hence, two angles $\phi_{cam}$ are calculated by the master controller 54. With two angles $\phi_{cam}$ available, the master controller 54 can determine the intersection of the lines extending from the optical axes of the digital cameras which generated the PIPs, that intersect the pointer within the acquired images. Using triangulation the position of the pointer relative to the touch screen in Cartesian coordinates can be accurately calculated if the amount that the extremities of the fields of view of the digital cameras $DC_{cam}$ extend beyond the designated peripheral edge of the touch surface 60 are known. However because the angles $\phi_{cam}$ are angularly offset with respect to the designated peripheral edges of the touch surface by unknown amounts, calculating the position of the pointer in this manner does not accurately determine the actual position of the pointer relative to the touch surface 60. As a result, it is necessary to calibrate the touch system 50 to take into account the angular offsets $\delta_{cam}$ of the digital cameras $DC_{cam}$ so that the actual position of the pointer relative to the touch surface 60 can be determined.

To calibrate the touch system 50, it is necessary to convert each calculated angle $\phi_{cam}$ into a rectangular position $(x_i, y_i)$ on the touch surface 60. Relationships exists between the coordinates $(x_i, y_i)$ on the touch surface 60 and the angles $\phi_{cam}$ that allow this conversion to be performed. If the origin of touch screen coordinate system is taken to be at digital camera $DC_0$, and the horizontal and vertical dimensions of the touch screen are taken to be $B_x$ and $B_y$ respectively, the following equations apply:

$$\tan(\phi_0 - \delta_0) = \frac{y_i}{x_i} \quad (0.2)$$

$$\tan(\phi_1 - \delta_1) = \frac{B_y - y_i}{x_i} \quad (0.3)$$

$$\tan(\phi_2 - \delta_2) = \frac{B_y - y_i}{B_x - x_i} \quad (0.4)$$

$$\tan(\phi_3 - \delta_3) = \frac{y_i}{B_x - x_i} \quad (0.5)$$

In order to reference each angle $\phi_{cam}$ to a common reference frame that corresponds to the touch screen coordinate system and develop a single equation that applies to all four digital cameras $DC_{cam}$, it is necessary to change some definitions in the above equations. First, introduce a set of angles $\beta_{cam}$ defined by:

$$\beta_{cam} = \Phi_{cam} - \delta_{cam} \quad (0.6)$$

The angles $\beta_{cam}$ are the angles $\phi_{cam}$ but referenced to the designated peripheral edges of the touch screen, in this case the horizontal edges 60a and 60b. Next introduce a set of angles $\alpha_{cam}$ which are referenced to the y-axis of the touch screen coordinate system and are related to the angles $\beta_{cam}$ as follows:

$$\alpha_0 = \frac{3\pi}{2} - \beta_0 \quad (0.7)$$

$$\alpha_1 = \frac{3\pi}{2} + \beta_1 \quad (0.8)$$

$$\alpha_2 = \frac{\pi}{2} - \beta_2 \quad (0.9)$$

$$\alpha_3 = \frac{\pi}{2} + \beta_3 \quad (0.10)$$

Finally, introduce a third set of angles $\omega_{cam}$ that are related to the angles $\alpha_{cam}$ as follows:

$$\omega_{cam} = \alpha_{cam} - \delta_{cam} \quad (0.11)$$

Replacing the angles $\alpha_{cam}$ their definitions set out in equations (0.7) to (0.10) and replacing the angles $\beta_{cam}$ by the definition set out in equation (0.6), allows the angles $\omega_{cam}$ to be expressed as follows:

$$\omega_0 = \frac{3\pi}{2} - \phi_0 \quad (0.12)$$

$$\omega_1 = \frac{3\pi}{2} + \phi_1 \quad (0.13)$$

$$\omega_2 = \frac{\pi}{2} - \phi_2 \quad (0.14)$$

$$\omega_3 = \frac{\pi}{2} + \phi_3 \quad (0.15)$$

As will be appreciated, equations (0.12) to (0.15) allow the angles $\phi_{cam}$ to be put into a reference frame that corresponds with the touch screen coordinate system. Moreover, the angles $\alpha_{cam}$ can be expressed as:

$$\alpha_{cam} = \arctan x_{cam} - \frac{x_i}{y_{cam} - y_i} \quad (0.16)$$

Expressing the angles $\alpha_{cam}$ in terms of the angles $\omega_{cam}$, yields the expression:

$$\omega_{cam} = \arctan\left[\frac{x_{cam} - x_i}{y_{cam} - y_i}\right] + \delta_{cam} \quad (0.17)$$

Equation (0.17) therefore provides a way of fitting the angles $\omega_{cam}$ in a manner that allows the rectangular coordinates $(x_i, y_i)$ of a pointer in close proximity to the touch screen as well as the offset angles $\delta_{cam}$ of the digital cameras $DC_{cam}$ to be calculated provided an angle $\phi_{cam}$ corresponding to at least one pointer contact point on the touch surface 60 is available. This is due to the fact that for a given contact on the touch surface, the angles $\omega_{cam}$ can be calculated using equations (0.12) to (0.15), the coordinates $(x_{cam}, y_{cam})$ of the digital cameras $DC_{cam}$ with respect to the touch screen coordinate system are known and the pointer coordinates $(x_i, y_i)$ are the same for each digital camera. However, since equation (0.17) is nonlinear in the coordinates $(x_i, y_i)$, it is necessary to use a linearization technique to fit the angles $\omega_{cam}$.

Therefore in accordance with the present invention, during calibration of the touch system 50, a pointer is used to contact the touch surface 60 at a plurality of contact points. Assuming that each contact point is within the field of view of each digital camera $DC_{cam}$, for each contact point $(x_i, y_i)$ on the touch surface 60, the angles $\omega_0$ to $\omega_3$ are calculated. Using equation (0.17), a system of equations is developed. From the system of equations, the coordinates of each contact point $(x_i, y_i)$ and the offset angle $\delta_{cam}$ of each digital camera $DC_{cam}$ can be determined using a nonlinear least-squares technique. Depending on the number of contact points used during the calibration, the system of equations may be over-determined or under-determined.

To unify the treatment of the system of equations regardless of whether the system of equations is over-determined or under-determined, the Moore-Penrose pseudo-inverse method that is based on singular value decomposition (SVD) is used to determine a least squares solution.

As will be appreciated, a matrix can always be decomposed in the following way:

$$A = USV^T \quad (0.18)$$

Matrix A can have any shape. The matrices U and V are orthogonal matrices, meaning that:

$$U^T U = I = V^T V$$

The diagonal matrix S is composed entirely of the singular values of matrix A, which are related to the squares of the eigenvalues of matrix A. The importance of the singular value decomposition (SVD) lies in the fact that with it, the inverse of matrix A can always be computed. Moreover, it is possible to control this inversion when a poorly determined problem is encountered. Consider the system of linear equations:

$$A\vec{x} = \vec{b}$$

whose solution would be:

$$\bar{x} = A^{-1}\vec{b}$$

SVD allows the inverse of matrix A to be written as:

$$A^{-1} = VS^{-1}U^T \quad (0.19)$$

since both matrices U and V are orthogonal. In a poorly determined situation, some of the singular value will be very small, so that when matrix $S^{-1}$ is formed, large values will be produced, which is not desirable. In this case, the inverses of the smallest singular values are set to zero. This has the effect of eliminating the poorly determined part of the solution. For least-squares problems, this is a powerful tool. The usual normal equations method for least-squares problems is based on solving:

$$A^T A \bar{x} = A^T \bar{b} \quad (0.20)$$
$$\bar{x} = (A^T A)^{-1} A^T \bar{b}$$

in the over-determined case, and solving:

$$\bar{x} = A^T (AA^T)^{-1} \bar{b} \quad (0.21)$$

in the under-determined case. As a result, the solution to the system of equations in either the underdetermined or over-determined case can be determined using one procedure.

Once the offset angles $\delta_{cam}$ for the digital cameras $DC_{cam}$ are known, the offset angles $\delta_{cam}$ are stored in memory by the master controller 54. During operation of the touch system 50, when the master controller 54 is calculating the angles $\phi_{cam}$, the actual offset angles $\delta_{cam}$ of the digital cameras are used to adjust the results. Thus, when translation is performed by the master controller 54 using the calculated angles $\phi_{cam}$ to determine the position of the pointer relative to the touch surface 60, the calculated position accurately reflects the actual position of the pointer relative the touch surface 60. This is due to the fact that the angles $\phi_{cam}$ are referenced to designated peripheral edges of the touch screen and hence, the touch screen coordinate system.

Although the touch system 50 has been described as including a projector to project images on the touch screen, those of skill in the art will appreciate that this is not required. The touch screen may be transparent or translucent and placed over a display unit so that the display presented on the display unit is visible through the touch screen. Also, the touch screen need not be a rectangular sheet of material bordered by a frame. The touch screen may in fact be virtually any surface within overlapping fields of view of two or more cameras.

Although the Moore-Penrose pseudo-inverse method has been used to fit the angles $\omega_{cam}$ to equation (0.17), those of skill in the art will appreciate that other mathematical linearization techniques may be used. For example, the angles $\omega_{cam}$ can be fitted to equation (0.17) using the second-order Newton least squares method or the Gauss-Newton least squares method.

Figure 3:
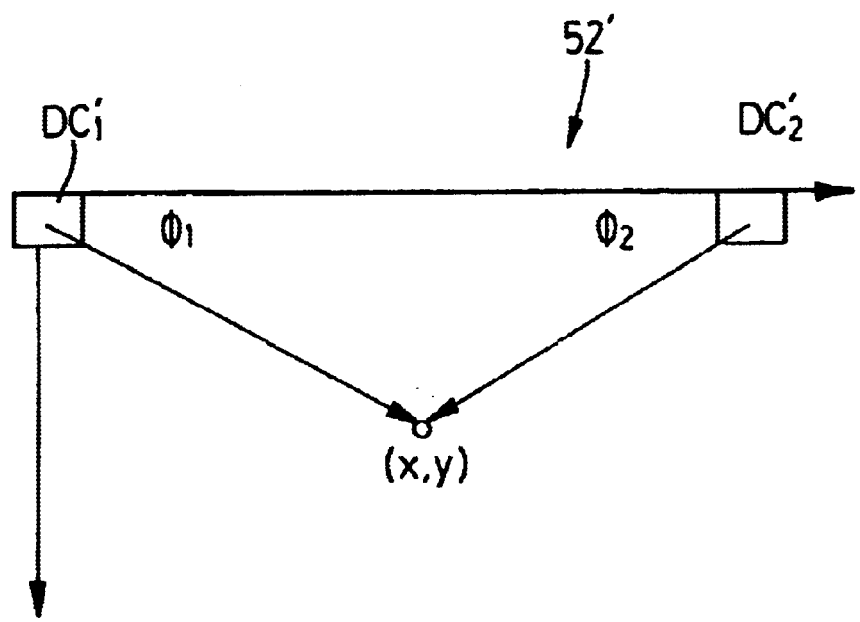
FIG. 3 is a front view of another embodiment of a touch screen.

Although the touch system 50 is shown as including four digital cameras, one located adjacent each corner of the touch screen, the calibration method applies to touch systems with different numbers of cameras. For example, FIG. 3 shows a touch screen 52' including only two DSP-based digital cameras $DC'_{cam}$. In order to determine the digital camera offsets $\delta$ for the digital cameras, it is first necessary to define a coordinate system for the touch screen. In this example, digital camera $DC'_1$ is taken to be at the origin of the coordinate system with the x axis pointing to the right and the y axis pointing downward. This convention is used so that the vertical touch screen dimension $B_y$ is eliminated.

From the FIG. 3, it can be seen that the angles $\phi_{cam}$ are defined by:

$$\tan\phi_1 = \frac{y}{x} \quad (1.1)$$

$$\tan\phi_2 = \frac{y}{B_x - x}$$

where $B_x$ is the horizontal distance between the digital cameras $DC'_1$, and $DC'_2$. By solving these equations for x and y, initial estimates are found to be:

$$x = \frac{B_x \tan\phi_2}{\tan\phi_1 + \tan\phi_2} \quad (1.2)$$

$$y = \frac{B_x \tan\phi_1 \tan\phi_2}{\tan\phi_1 + \tan\phi_2} = x\tan\phi_1$$

The information required now is just the elements of the design matrix, including terms for a variable $B_x$. Expressing these as the gradients of the appropriate functions yields:

$$\nabla \phi_1(x, y) = \left[ \frac{-y}{x^2 + y^2} \quad \frac{x}{x^2 + y^2} \right]$$

$$\nabla \phi_2(x, y, B_x) = \left[ \frac{y}{(B_x - x)^2 + y^2} \quad \frac{B_x - x}{(B_x - x)^2 + y^2} \quad \frac{-y}{(B_x - x)^2 + y^2} \right]$$

All this means is that there is an extra column in the design matrix corresponding to the change in $B_x$.

It is necessary to define angles $\omega_{cam}$ and the offset angles $\delta_{cam}$ carefully in this case. For the present problem, the angles $\omega_{cam}$ are expressed as:

$$\omega_1 = \frac{3\pi}{2} - \phi_1 \quad (1.3)$$

$$\omega_2 = \frac{\pi}{2} + \phi_2 \quad (1.4)$$

Also, the correct sense of the offset angle $\delta_{cam}$ is obtained by adding 180 degrees to their final values and then reversing their signs.

As the present system of equations is underdetermined, a least squares minimum-norm solution is adopted. There are 11 unknowns to be determined from 8 measurements. The correction vector $\bar{x}$ is found from:

$$\bar{x} = A^T \left( AA^T + \frac{I}{V} \right)^{-1} \bar{b} \quad (1.5)$$

Figure 4:
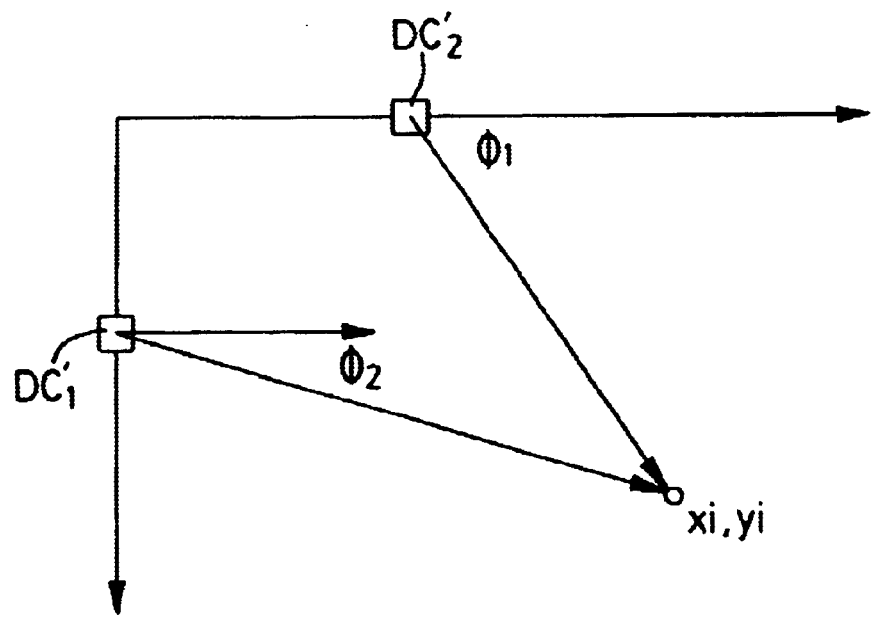
FIG. 4 is a front view of yet another embodiment of a touch screen.

In addition to having the two digital cameras located at the corners of the touch screen 52', the digital cameras $DC'_{cam}$ may be positioned relative to the touch screen in the configuration shown in FIG. 4. In this example, a diagonal distance d separates the digital cameras. If digital camera $DC'_1$ is located at $(x_c, 0)$ and digital camera $DC'_2$ at $(0, y_c)$, then d the distance d is given by:

$$d = \sqrt{x_c^2 + y_c^2}$$

The angles $\phi_{cam}$ are defined by:

$$\tan\phi_1 = \frac{y_1}{x_1 - x_c} \quad (1.6)$$

$$\tan\phi_2 = \frac{y_1 - y_c}{x_1} \quad (1.7)$$

Solving for $(x_i, y_i)$ gives:

$$x_1 = \frac{y_c + x_c \tan\phi_1}{\tan\phi_1 - \tan\phi_2} \quad (1.8)$$

$$y_1 = \frac{\tan\phi_1 [y_c + x_c \tan\phi_2]}{\tan\phi_1 - \tan\phi_2} = x_1 \tan\phi_1 \quad (1.9)$$

The above equations are good initial estimates although a general equation for the angles $\phi_{cam}$ can be written as:

$$\phi_{cam} = \arctan\left[\frac{y_i - y_c^1}{x_i - x_c^j}\right] - \delta_{cam} \quad (2.0)$$

where a camera offset angle $\delta_{cam}$ has been introduced.

It is possible to do a calibration solution using a single point. This is achieved by writing defining equations for the angles $\phi_{cam}$ as follows:

$$f = \tan\phi_1 - \frac{y_i}{x_i - x_c} \quad (2.1)$$

$$g = \tan\phi_2 - \frac{y_i - y_c}{x_i} \quad (2.2)$$

Assuming that the angles $\phi_{cam}$ are known, the solution $(x_i, y_i)$ can be treated as the roots of the system of simultaneous equations. Newton's method for two variables is:

$$x_{n+1} = x_n - \frac{fg_y f_y g}{f_x g_y - f_y g_x} \quad (2.3)$$

$$y_{n+1} = y_n - \frac{f_x g - g_x f}{f_x g_y - f_y g_x} \quad (2.4)$$

As will be appreciated, the present system allows the camera offsets relative to a Cartisian reference frame to be determined so that the position of an object in Cartisian co-ordinates within overlapping fields of view of a pair of cameras relative to a surface within the reference frame can be accurately determined.

Although preferred embodiments of the present invention have been described, those of skill in the art will appreciate that variations and modifications may be made without departing from the spirit and scope thereof as defined by the appended claims.

What is claimed is:

1. A method of determining the position of an object relative to a rectangular reference frame from captured images of the object based on multiple triangulation results, the captured images being taken by at least two pair of cameras at the corners of said reference frame having fields of view encompassing said reference frame, each of said cameras having an offset angle resulting in an extremity of the field of view thereof extending beyond a boundary of said reference frame, said method comprising the steps of:

capturing an image of the object using each camera of said at least two pair at at least one location within said reference frame;

for each location:
determining the position of the object within each captured image and for each captured image placing the determined position into a coordinate system corresponding to that of said reference frame, wherein the determined position of the object within each image is represented by an angle $\phi$, said angle being equal to the angle formed between the extremity of the field of view extending beyond the reference frame boundary and a line extending from the camera that intersects the object within the image; and processing the determined positions to determine the position of the object at each location and the offset angle of said at least one camera, wherein during said processing each said angle $\phi$ is converted to an angle $\omega$, said angle $\omega$ being represented by:

$$\omega = \alpha - \delta$$

where:
$\delta$ is the camera offset angle; and
$\alpha$ is equal to the angle $\phi$ with the camera offset angle removed and referenced to the y-axis of the reference frame coordinate system and wherein each said angle $\omega$ is fitted to the equation:

$$\omega_{cam} = \arctan\left[\frac{x_{cam} - x_i}{y_{cam} - y_i}\right] + \delta_{cam}$$

where:
$x_{cam}$ and $y_{cam}$ are the rectangular coordinates of the camera; and
$x_i$ and $y_i$ are the rectangular coordinates of the object, thereby to yield the rectangular position $(x_i, y_i)$ and the camera offset angle.

2. The method of claim 1 wherein the fitting is performed using a linearization technique.

3. The method of claim 2 wherein said linearization technique is the Moore-Penrose pseudo-inverse method.

4. A method of determining the position of an object relative to a reference frame from captured images of the object based on multiple triangulation results, the captured images being taken by at least two pair of cameras having fields of view encompassing the reference frame, an extremity of the field of view of each camera encompassing a boundary of said reference frame, at least one of said cameras being offset causing the extremity of the field of view thereof to extend beyond said boundary, the offset defining an offset angle, said method comprising the steps of:

determining the position of the object within each image, the position of the object within each image being represented by an angle, said angle being equal to the angle formed between the extremity of the field of view of the camera that acquired the image and a line extending from that camera that intersects the object within the image;

determining the offset angle for each offset camera;

for each offset camera subtracting the offset angle from the angle representing the position of the object within the image taken by said offset camera to calibrate the angle; and for each pair of cameras using the calibrated angles to calculate the position of the object with respect to the reference frame using triangulation.

5. The method of claim 4 wherein two or more of said cameras are offset.

6. In a touch system including at least two pair of cameras and a processor to process images acquired by said at least two pair cameras, where the position of an object that is within the fields of view of said cameras relative to a reference frame is determined by triangulating object position data in images acquired by the cameras of each pair, a method of calibrating the touch system comprising the steps of:
- determining an offset angle of each camera relative to the reference frame, said offset angle representing the degree by which the field of view of the camera extends beyond said reference frame;
- for each camera, using the offset angle to calibrate the object position data developed from the image acquired by that camera; and
- using the calibrated object position data during triangulation for each pair of cameras to determine the position of said object relative to said reference frame.

7. In a touch system including a reference frame, and at least two pair of cameras having fields of view that encompass said reference frame, wherein the position of an object relative to the reference frame is determined from captured images of the object based on multiple triangulation results, and wherein the fields of view of at least some of said cameras are rotated with respect to the coordinate system of said reference frame to define offset angles, a method of calibrating said touch system comprising the steps of:
- capturing an image of the object using each camera of said at least two pair at at least one location within said reference frame; and
- for each location:
  - determining the position of the object within each captured image, the position of the object within each captured image being represented by an angle $\phi$, said angle being equal to the angle formed between an extremity of the field of view of the camera that acquired the image extending beyond the reference frame and a line extending from that camera that intersects the object within the image; and
  - mathematically calculating the offset angles of the cameras having rotated fields of view based on the angle determined for each image and the position of the cameras relative to the coordinate system assigned to said reference frame.

8. The method of claim 7 wherein the offset angle of each camera is calculated using a least squares method.

9. A touch system comprising:
- a generally rectangular reference frame surrounding a touch surface, one corner of the reference frame defining the origin of a coordinate system assigned to said touch surface;
- a camera adjacent each corner of the reference frame, each camera being aimed towards said touch surface and capturing images of said touch surface within the field of view thereof, fields of view of said cameras overlapping within said reference frame, the fields of view of said cameras being offset with respect to said reference frame; and
- a processor processing the captured images and generating object position data when an object appears in images, said processor determining the position of said object relative to said origin in rectangular coordinates using said object position data based on multiple triangulation results, wherein said processor further executes a calibration routine to determine offset angles of said cameras, said offset angles being used by said processor to adjust said object position data thereby to align said multiple triangulation results prior to said position determination.

10. The method of claim 5 wherein the offset angle for each offset camera is determined using a least squares method.

11. The method of claim 5 wherein said at least two pair of cameras include at least three cameras, each camera being located adjacent a different corner of said reference frame.

12. The method of claim 6 wherein the offset angle for each offset camera is determined using a least squares method.

13. The method of claim 6 wherein said at least two pair of cameras include at least three cameras, each camera being located adjacent a different corner of said reference frame.

14. The method of claim 7 wherein during said processing each said angle is converted into a rectangular $(x_i, y_i)$ position within the reference frame coordinate system.

15. The method of claim 14 wherein captured images are acquired by cameras at the corners of a rectangular reference frame, each of said cameras having a field of view offset with respect to said reference frame, during said processing each said angle $\phi$ being converted to an angle $\omega$, said angle $\omega$ being represented by:

$$\omega = \alpha - \delta$$

where:
- $\delta$ is the camera offset angle; and
- $\alpha$ is equal to the angle $\phi$ with the camera offset angle removed and referenced to the y-axis of the reference frame coordinate system and wherein each said angle $\omega$ is fitted to the equation:

$$\omega_{cam} = \arctan\left[\frac{x_{cam} - x_i}{y_{cam} - y_i}\right] + \delta_{cam}$$

where:
- $x_{cam}$ and $y_{cam}$ are the rectangular coordinates of the camera; and
- $x_i$ and $y_i$ are the rectangular coordinates of the object, thereby to yield the rectangular position $(x_i, y_i)$ and the camera offset angle.

16. The method of claim 15 wherein the fitting is performed using a linearization technique.

17. The method of claim 15 wherein said linearization technique is the Moore-Penrose pseudo-inverse method.

18. A touch system according to claim 9 wherein said processor determines the offset angles using a least squares method.

19. A touch system comprising:
- a substantially rectangular touch surface;
- imaging devices mounted adjacent at least three corners of said touch surface to define at least two triangulation pair of imaging devices, each imaging device having a field of view looking across said touch surface, said imaging devices being oriented to capture overlapping images of said touch surface; and
- at least one processing device processing captured images to determine the position of at least one pointer appearing in the captured images based on multiple triangular results, the fields of view of said imaging devices being calibrated by said at least one processing device to determine offset angles of said imaging devices prior to determining the position of the at least one pointer thereby to align said multiple triangulation results.

20. A touch system according to claim 19 comprising an imaging device at each corner of said touch surface to define at least four triangulation pair of imaging devices.

21. A touch system according to claim 19 wherein during said calibration, said at least one processing device determines the degree by which the field of view of each imaging device extends beyond the boundary of said touch surface.

22. A touch system according to claim 21 wherein the degree by which the field of view of each imaging device extends beyond the boundary of said touch surface is determined using a least squares method.

23. A user input system comprising:
    at least two pair of imaging devices having overlapping fields of view oriented to capture images of a region of interest in which at least one pointer can be positioned; and
    at least one processing device processing pointer data extracted from the captured images acquired by the imaging devices using triangulation to yield a triangulation result for each pair of imaging devices thereby to determine the position of said at least one pointer within said region of interest, said at least one processing device adjusting the pointer data prior to processing by determining offset angles of said imaging devices to compensate for fields of view of said imaging devices that extend beyond the periphery of said region of interest thereby to align the triangulation results.

24. A user input system according to claim 23 wherein the degree by which the field of view of each imaging device extends beyond the boundary of said touch surface is determined using a least squares method.

25. A user input system according to claim 23 wherein said region of interest encompasses a touch surface.

26. A user input system according to claim 25 wherein said at least two pair of imaging devices include at least three imaging devices, each being located adjacent a different corner of said touch surface.

27. A touch system according to claim 21 wherein the pointer in each image is represented by an angle $\phi$, each angle $\phi$ being equal to the angle formed between the extremity of the field of view extending beyond the touch surface and a line extending from the imaging device that intersects the pointer and wherein said at least one processing device converts each said angle $\phi$ to an angle $\omega$, said angle $\omega$ being represented by:

$$\omega = \alpha - \delta$$

where:
    $\delta$ is an imaging device offset angle representing the degree by which the field of view of the imaging device extends beyond said boundary; and
    $\alpha$ is equal to the angle $\phi$ with the imaging device offset angle removed and referenced to the y-axis of the touch surface coordinate system and wherein each said angle $\omega$ is fitted to the equation:

$$\omega_{cam} = \arctan\left[\frac{x_{cam} - x_i}{y_{cam} - y_i}\right] + \delta_{cam}$$

where:
    $x_{cam}$ and $y_{cam}$ are the rectangular coordinates of the imaging device; and
    $x_i$, and $y_i$ are the rectangular coordinates of the pointer, thereby to yield the rectangular position $(x_i, y_i)$ and the imaging device offset angle.

28. A touch system according to claim 27 wherein said at least one processing device uses a linerization technique to fit each said angle $\omega$ to the equation.

29. A user input system according to claim 25 wherein the pointer in each image is represented by an angle $\phi$, each angle $\phi$ being equal to the angle formed between the extremity of the field of view extending beyond the touch surface and a line extending from the imaging device that intersects the pointer and wherein said at least one processing device converts each said angle $\phi$ to an angle $\omega$, said angle $\omega$ being represented by:

$$\omega = \alpha - \delta$$

where:
    $\delta$ is an imaging device offset angle representing the degree by which the field of view of the imaging device extends beyond said boundary; and
    $\alpha$ is equal to the angle $\phi$ with the imaging device offset angle removed and referenced to the y-axis of the touch surface coordinate system and wherein each said angle $\omega$ is fitted to the equation:

$$\omega_{cam} = \arctan\left[\frac{x_{cam} - x_i}{y_{cam} - y_i}\right] + \delta_{cam}$$

where:
    $x_{cam}$ and $y_{cam}$ are the rectangular coordinates of the imaging device; and
    $x_i$ and $y_i$ are the rectangular coordinates of the pointer, thereby to yield the rectangular position $(x_i, y_i)$ and the imaging device offset angle.

30. A user input system according to claim 29 wherein said at least one processing device uses a linerization technique to fit each said angle $\omega$ to the equation.

31. A user input system according to claim 25 comprising an imaging device at each corner of said touch surface to define at least four triangulation pair of imaging devices.

32. A user input system according to claim 31 wherein the pointer in each image is represented by an angle $\phi$, each angle $\phi$ being equal to the angle formed between the extremity of the field of view extending beyond the touch surface and a line extending from the imaging device that intersects the pointer and wherein said at least one processing device converts each said angle $\phi$ to an angle $\omega$, said angle $\omega$ being represented by:

$$\omega = \alpha - \delta$$

where:
    $\delta$ is an imaging device offset angle representing the degree by which the field of view of the imaging device extends beyond said boundary; and
    $\alpha$ is equal to the angle $\phi$ with the imaging device offset angle removed and referenced to the y-axis of the touch surface coordinate system and wherein each said angle $\omega$ is fitted to the equation:

$$\omega_{cam} = \arctan\left[\frac{x_{cam} - x_i}{y_{cam} - y_i}\right] + \delta_{cam}$$

where:
    $x_{cam}$ and $y_{cam}$ are the rectangular coordinates of the imaging device; and
    $x_i$ and $y_i$ are the rectangular coordinates of the pointer, thereby to yield the rectangular position $(x_i, y_i)$ and the imaging device offset angle.

33. A user input system according to claim 32 wherein said at least one processing device uses a linerization technique to fit each said angle $\omega$ to the equation.

* * * * *

UNITED STATES PATENT AND TRADEMARK OFFICE
CERTIFICATE OF CORRECTION

PATENT NO.        : 6,919,880 B2
APPLICATION NO. : 09/870698
DATED             : July 19, 2005
INVENTOR(S)       : Gerald Morrison and David Holmgren It is certified that error appears in the above-identified patent and that said Letters Patent is hereby corrected as shown below:

On the Cover Page, in the Title, " (54) CALIBRATING CAMERA OFFSETS TO FACILITATE OBJECT POSITION DETERMINATION USING TRIANGULATION" should read -- (54) CALCULATING CAMERA OFFSETS TO FACILITATE OBJECT POSITION DETERMINATION USING TRIANGULATION--.

On the Cover Page, "(73) Assignee: Smart Technologies Inc. (CA)" should read --SMART Technologies Inc (CA).--.

On the Cover Page, in the abstract, line 9, "at least two cameras at least one location" should read --at least two cameras at at least one location--.

On the Cover Page, in the Representative Drawing, "62 a" should read --60a--.
On the Cover Page, in the Representative Drawing, "62 b" should read --60b--.

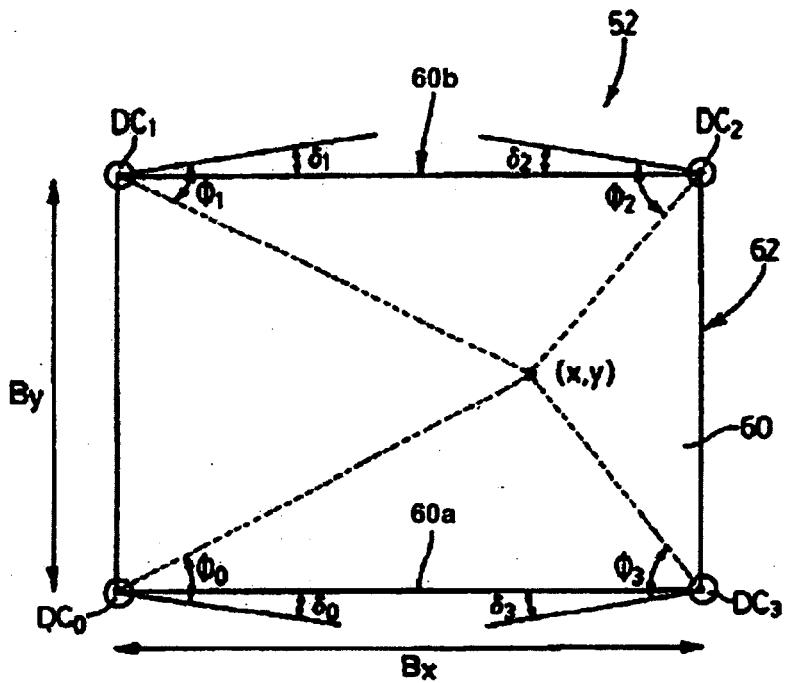

UNITED STATES PATENT AND TRADEMARK OFFICE
CERTIFICATE OF CORRECTION

| | |
|---|---|
| PATENT NO. | : 6,919,880 B2 |
| APPLICATION NO. | : 09/870698 |
| DATED | : July 19, 2005 |
| INVENTOR(S) | : Gerald Morrison and David Holmgren |

It is certified that error appears in the above-identified patent and that said Letters Patent is hereby corrected as shown below:

In the Drawings, Figure 2, "62a" should read --60a--.
In the Drawings, Figure 2, "62b" should read --60b--.

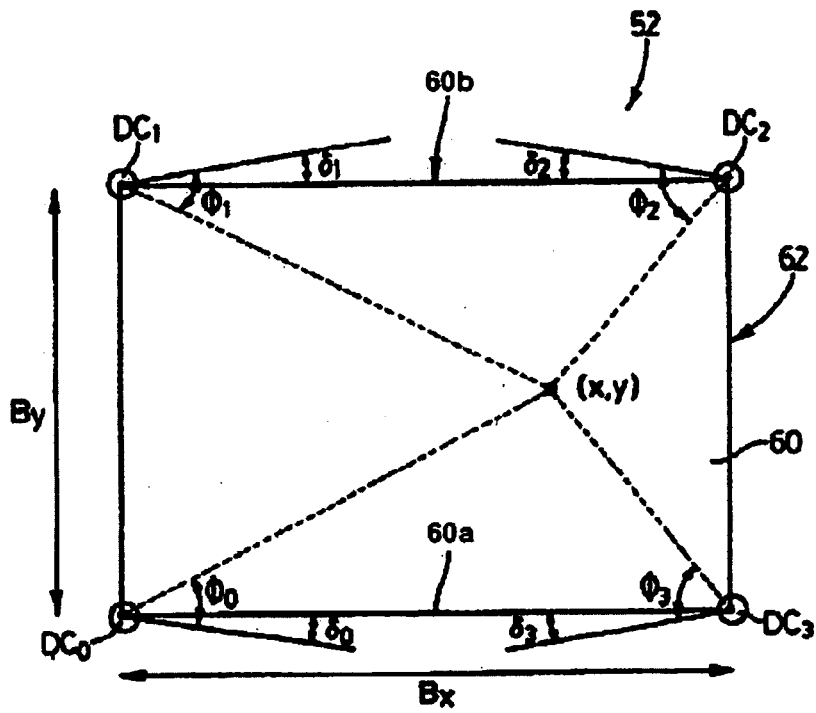

FIG. 2

Column 4, line 12, "determine the position of the object" should read --determining the position of the object--.

Column 5, line 24, "the touch is system" should read --the touch system--.

Column 5, line 52, "based on CMOS digital care" should read --based on CMOS digital camera--.

Column 6, line 22, Equation (0.1), "2(x/a)tan" portion of equation needs to be part of the numerator.

UNITED STATES PATENT AND TRADEMARK OFFICE
CERTIFICATE OF CORRECTION

PATENT NO. : 6,919,880 B2
APPLICATION NO. : 09/870698
DATED : July 19, 2005
INVENTOR(S) : Gerald Morrison and David Holmgren It is certified that error appears in the above-identified patent and that said Letters Patent is hereby corrected as shown below:

Column 6, Line 58, "edge of the touch surface" should read --edges of the touch surface--.

Column 8, Line 5, Equation (0.16), "$x_{cam}$" portion of equation needs to be part of the numerator.

Column 8, line 5, Equation (0.16) – "$x_{cam}$" portion of equation needs to be part of the numerator.

Column 8, line 65, " $A\overline{x} = \vec{b}$ " should read -- $A\vec{x} = \vec{b}$ --.

Column 9, line 2, " $\overline{x} = A^{-1}\vec{b}$ " should read -- $\vec{x} = A^{-1}\vec{b}$ --.

Column 9, line 20, Equation (0.20), " $A^T A\overline{x} = A^T \vec{b}$ " should read -- $A^T A\vec{x} = A^T \vec{b}$ --.

Column 9, line 22, Equation (0.20), " $\overline{x} = (A^T A)^{-1} A^T \vec{b}$ " should read -- $\vec{x} = (A^T A)^{-1} A^T \vec{b}$ --.

Column 9, line 26, Equation (0.21), " $\overline{x} = A^T (AA^T)^{-1} \vec{b}$ " should read -- $\vec{x} = A^T (AA^T)^{-1} \vec{b}$ --.

Column 9, line 37, "when translation" should read --when triangulation--.

Column 10, line 52, "correction vector $\overline{x}$ " should read --correction vector $\vec{x}$ --.

Column 10, line 54, Equation (1.5), " $\overline{x} = A^T (AA^T + I/V)^{-1} \vec{b}$ " should read -- $\vec{x} = A^T (AA^T + I/V)^{-1} \vec{b}$ --.

Column 11, line 20, Equation (2.0), numerator "$y_i - y_c^1$" should read -- $y_i - y_c^i$ --.

Column 14, line 62, "multiple triangular" should read --multiple triangulation--.

Column 14, lines 64-65, "device to determine offset angles of said imaging devices prior to" should read --device to determine offset angles of said imaging device prior to--.

UNITED STATES PATENT AND TRADEMARK OFFICE
CERTIFICATE OF CORRECTION

PATENT NO. : 6,919,880 B2
APPLICATION NO. : 09/870698
DATED : July 19, 2005
INVENTOR(S) : Gerald Morrison and David Holmgren It is certified that error appears in the above-identified patent and that said Letters Patent is hereby corrected as shown below:

Column 15, lines 25-26, "by determining offset angles of said imaging devices to compensate for fields of view of said imaging devices" should read --by determining offset angles of said imaging devices to compensate for fields of view of imaging devices--.

Signed and Sealed this

Seventeenth Day of October, 2006

JON W. DUDAS
*Director of the United States Patent and Trademark Office*